(12) United States Patent
Fort et al.

(10) Patent No.: US 10,473,276 B2
(45) Date of Patent: Nov. 12, 2019

(54) DEVICE WITH A LIGHT SIGNALLING FUNCTION

(71) Applicant: Schneider Electric Industries SAS, Rueil-Malmaison (FR)

(72) Inventors: Thierry Fort, Gimeux (FR); Patrice Thizon, Ruelle-sur-Touvre (FR); Marcel Pouyollon, Gond Pontouvre (FR); Sophie Lorrain, Mornac (FR); Youssef Yousfi, Puymoyen (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/840,147

(22) Filed: Dec. 13, 2017

(65) Prior Publication Data
US 2018/0216790 A1 Aug. 2, 2018

(30) Foreign Application Priority Data

Feb. 1, 2017 (FR) ...................................... 17 50830

(51) Int. Cl.
*F21K 9/64* (2016.01)
*F21V 9/30* (2018.01)
(Continued)

(52) U.S. Cl.
CPC .................. *F21K 9/64* (2016.08); *F21V 9/08* (2013.01); *F21V 9/30* (2018.02); *F21V 23/04* (2013.01);
(Continued)

(58) Field of Classification Search
CPC ... F21K 9/64; F21V 9/08; F21V 23/04; F21V 9/30; G08B 5/36; G02B 6/0083;
(Continued)

(56) References Cited

U.S. PATENT DOCUMENTS 6,340,824 B1 * 1/2002 Komoto ................ H01L 33/507
257/100
2002/0079506 A1 6/2002 Komoto et al.
(Continued)

FOREIGN PATENT DOCUMENTS

EP 2 814 048 A1 12/2014
WO WO 2007/079423 A2 7/2007

OTHER PUBLICATIONS

French Preliminary Search Report dated May 29, 2017 in French Application 17 50830 filed on Feb. 1, 2017 (with English Translation of Categories of Cited Documents and Written Opinion).

*Primary Examiner* — Hirdepal Singh
(74) *Attorney, Agent, or Firm* — Oblon, McClelland, Maier & Neustadt, L.L.P.

(57) ABSTRACT

A device with a light signaling function including a light-emitting diode designed to emit a first light signal in a first wavelength range in the blue or the ultraviolet, conversion device arranged for converting the first light signal emitted by the light-emitting diode in the first wavelength range into a second light signal in a second wavelength range, a cap arranged for filtering the second light signal with a view to obtaining a color included in a standard color space. The conversion device being chosen so the second wavelength range includes the normal color space.

17 Claims, 6 Drawing Sheets

(51) Int. Cl.
*F21V 23/04* (2006.01)
*F21V 8/00* (2006.01)
*G08B 5/36* (2006.01)
*F21V 9/08* (2018.01)
*F21Y 115/10* (2016.01)
*F21W 111/00* (2006.01)
*F21W 131/403* (2006.01)

(52) U.S. Cl.
CPC ............ *G02B 6/009* (2013.01); *G02B 6/0083* (2013.01); *G08B 5/36* (2013.01); *F21W 2111/00* (2013.01); *F21W 2131/403* (2013.01); *F21Y 2115/10* (2016.08)

(58) Field of Classification Search
CPC .............. G02B 6/009; F21W 2131/403; F21W 2111/00; F21Y 2115/10
USPC ..................................................... 340/815.45
See application file for complete search history.

(56) References Cited

U.S. PATENT DOCUMENTS

| | | | |
|---|---|---|---|
| 2002/0088985 | A1 | 7/2002 | Komoto et al. |
| 2004/0124430 | A1 | 7/2004 | Yano et al. |
| 2004/0129542 | A1* | 7/2004 | Kawaguchi ............ H01H 9/182 200/61.1 |
| 2007/0080636 | A1* | 4/2007 | Lee ........................ H05B 33/04 313/512 |
| 2007/0164268 | A1 | 7/2007 | Curran et al. |
| 2008/0186700 | A1 | 8/2008 | Curran et al. |
| 2009/0321754 | A1 | 12/2009 | Curran et al. |
| 2011/0241034 | A1 | 10/2011 | Curran et al. |
| 2012/0327663 | A1* | 12/2012 | Doan ....................... F21V 9/08 362/294 |
| 2013/0215597 | A1* | 8/2013 | Davis ....................... F21V 7/22 362/84 |
| 2013/0242543 | A1* | 9/2013 | Do .......................... F21V 33/00 362/97.1 |
| 2014/0198480 | A1* | 7/2014 | Dai ..................... G02B 5/0242 362/84 |
| 2014/0328046 | A1* | 11/2014 | Aanegola ................ F21V 13/08 362/84 |
| 2014/0340891 | A1* | 11/2014 | Hyun .................. H05B 33/0803 362/231 |
| 2014/0372124 | A1* | 12/2014 | Thizon .................... G10L 15/28 704/270 |
| 2015/0049459 | A1* | 2/2015 | Peeters ............... H01L 25/0753 362/84 |
| 2015/0162503 | A1* | 6/2015 | Bechtel ................... H01L 33/46 257/98 |
| 2017/0062680 | A1* | 3/2017 | Yoo ........................ H01L 33/60 |
| 2018/0238519 | A1* | 8/2018 | Kuniyasu ................. F21V 9/40 |

* cited by examiner (X)

DEVICE WITH A LIGHT SIGNALLING FUNCTION

TECHNICAL FIELD OF THE INVENTION

The present invention relates to a device including a light signalling function.

PRIOR ART

A device, including a light signalling function and commonly used in the industrial field, is, for example, attached through a panel formed of the door of an electrical enclosure or of a control console. It generally consists of at least two parts. A first part comprises a light block with a light source. A second part comprises the body of the device onto which a cap is attached through which the light signal produced by the light source is emitted. The device may comprise a third part formed of a base that allows the mechanical connection to be made between the body of the device and the light block.

Now, for various reasons, notably space and service life, light blocks use one or more light-emitting diodes as a light source. Each light-emitting diode emits a light signal included in a determined wavelength range.

In a device with a light signalling function, obtaining the emitted colour is conventionally achieved by the combination of the colour emitted by the light-emitting diode and by the cap which is responsible for filtering the signal emitted by the diode in order to obtain a light in a wavelength range included in a standard colour space.

For obtaining the various colours specified by the standard, it is now necessary to have a plurality of distinct light blocks as well as a plurality of caps of distinct colours in order to obtain the standard conventional colours, i.e. notably white, green, red and blue.

A device with a light signalling function having this configuration is attached in an opening of standard diameter made through a panel. The body of the device passes through the opening to be supported against the front face of the panel, leaving the cap visible on the front of the panel. The base is attached from the rear and helps ensure the attachment of the body in the opening thanks to suitable attachment means. The light block is attached onto the base in a housing provided for this purpose. The light block is thus placed at the rear of the panel, making it difficult to access. Any operation on the light block, notably its replacement for obtaining another signalling colour, therefore proves impractical to implement.

Furthermore, clearly the current solution requires having available a plurality of light blocks with distinct colours, along with a number of caps for obtaining the various colours referred to above. It is also necessary to provide particular "light block-cap" combinations to ensure obtaining the various colours.

There are therefore a number of constraints in the use of the current solution, notably:
Commercial, linked to the number of references to be managed for each light block, each cap and each light block-cap combination;
Technical, linked notably to the installation of the device and its replacement for obtaining another colour.

U.S. Pat. No. 6,340,824B1 describes a light signalling solution including a light-emitting diode emitting a primary light signal, a converter placed above the diode for converting the primary light signal into a secondary light signal, a reflector placed above the converter for reflecting a part of the primary light signal and a light absorber placed above the reflector for selecting the secondary light signal and absorbing the primary light signal. The purpose of this solution is to provide a wavelength-stable light signal. Its objective is therefore not to obtain a particular colour included in a standard colour space.

The purpose of the invention is therefore to provide a device with a light signalling function which makes it possible to overcome the drawbacks of the prior art by providing a solution making it possible to obtain a colour included in a standard colour space with a particularly significant intensity.

DISCLOSURE OF THE INVENTION

This purpose is achieved by a device with a light signalling function designed to emit a light signal outwards in a "standard" colour space, said device including:
A light-emitting diode designed to emit a first light signal in a first wavelength range in the blue or the ultraviolet,
Conversion means arranged for converting said first light signal emitted by the light-emitting diode in said first wavelength range into a second light signal in a second wavelength range,
A cap (11) arranged for selecting a particular, more restricted wavelength range within the second wavelength range (L2) so as to obtain at the output a signal (S3) at a third wavelength (L3) corresponding to a colour included in said standard colour space,
The conversion means are configured so that said second wavelength range comprises said standard colour space.

Thus, the conversion means have a conversion function arranged for converting the first light signal into a second light signal, this second light signal including the standard colour space.

According to one distinctive feature, the conversion means comprise an element with a phosphor function inserted between the light-emitting diode and the cap.

According to a first variant embodiment, the device comprises a body, the element with a phosphor function comprising a first component and the cap comprising a second component, the first component and the second component being attached independently onto said body.

According to a second variant embodiment, the device comprises a body, the element with a phosphor function and the cap being assembled onto the body in the form of a single component produced by bi-injection.

According to a third variant embodiment, the element with a phosphor function comes in the form of a layer deposited on a surface of said cap.

According to another distinctive feature, the device comprises a light guide component arranged in the body of the device for guiding the first light signal towards said conversion means.

According to another distinctive feature, said light guide component is made of an opaque material.

According to another variant embodiment, the element with a phosphor function comprises a lens positioned above the light-emitting diode.

According to another distinctive feature, the device comprises a light block including said light-emitting diode.

According to another distinctive feature, the light block comprises a printed circuit board onto which said light-emitting diode is soldered.

According to another distinctive feature, the light block comprises a protuberance in which said light-emitting diode is housed, said protuberance including a transparent element through which said first light signal is emitted.

According to another distinctive feature, the device comprises a base including attachment means for attaching said light block.

According to another distinctive feature, the device also comprises a control function, implemented from a push-button or a rotary knob. The cap is then made with a component forming the push-button or the rotary knob.

BRIEF DESCRIPTION OF THE FIGURES

Other features and advantages will appear in the detailed description that follows made with reference to the appended drawings in which.

DETAILED DESCRIPTION OF AT LEAST ONE EMBODIMENT

In the rest of the description, the terms "top", "bottom", "upper", "lower", "above", "below" are to be understood as taking the axis (X, FIG. 2) as the reference, visible on the appended figures and represented along a vertical direction.

The invention relates to a device with a light signalling function. The solution provided is advantageous for a device with a light signalling function formed of at least two parts separable from each other, but it could quite as well be applied to a device in an integral form.

In a non-restrictive way, the inventive solution will be described below for a device with a light signalling function which comprises at least two parts separable from each other.

In addition, device with a light signalling function should be understood to mean any device providing a light signalling function. This therefore also includes devices having, in addition, a control function, e.g. push-buttons or rotary knobs, additionally provided with a light signalling function. For all these devices, the principle of the invention will remain the same. In the rest of the description, a device with a light signalling function will generally be referred to.

In a non-restrictive way, the device typically comprises three main parts:

A first part mainly including a body and a colour cap attached onto the body and through which light is diffused outwards;

A second part comprising a light block 12, advantageously removable and provided with at least one light-emitting diode 120;

Advantageously, a third part formed of a base attached onto the body of the first part of the device and provided with attachment means cooperating with corresponding attachment means in order to attach the light block.

Figure 2:
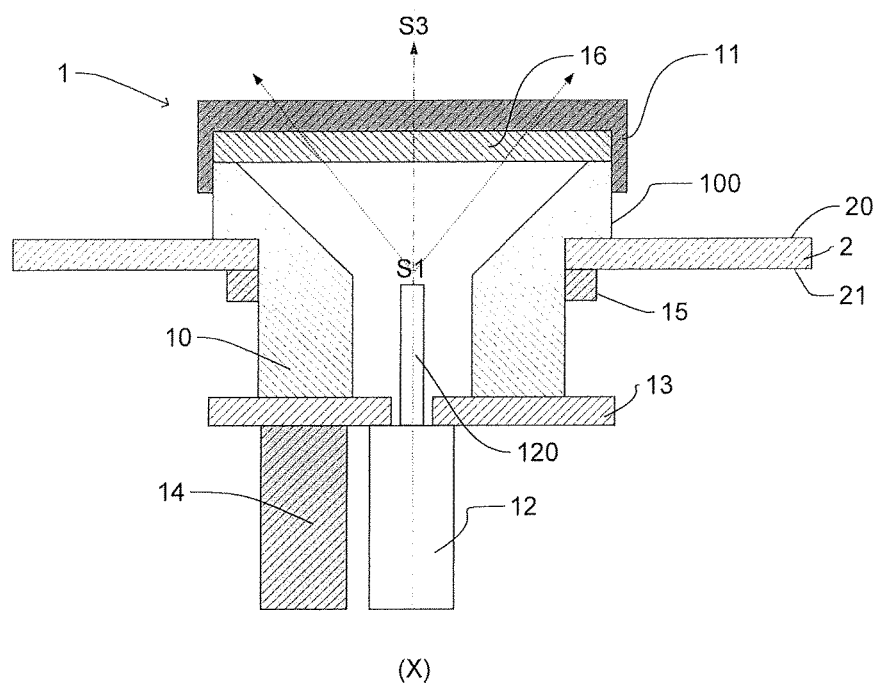
FIG. 2 schematically represents the device with a light signalling function of the invention.

Referring to FIG. 2, the device 1 is mounted by engaging in an opening formed through a metal wall 2, such as, for example, the door of an electrical enclosure or a control console. For a push-button or rotary knob, the opening is, for example, of a standard diameter e.g. equal to 22 mm. The wall comprises a first "outer" face 20, and a second "inner" face 21.

In a conventional but non-restrictive way, the device comprises a body 10 in the form of a tubular component about an axis (coinciding with the axis (X) in the figures) and intended to be inserted along the axis thereof through said opening in the wall 2. Along the axis thereof, the body 10 comprises a lower part and an upper part which may be separated from each other by a shoulder. The upper part is provided with an annular flange 100 intended to be supported on a first face, known as the outer face, of the wall 2 around the opening, so that the position thereof delimits, along a support plane P against the outer face of the wall 20, the visible part of the device located on a first side of the wall 2 with respect to the invisible part of the device located on a second side of the wall 2. A gasket is, for example, positioned between the flange 100 and the surface of the wall 2. In order to allow the passage of a luminous flux, the body is hollow along the axis (X). A luminous flux generated by the light block is capable of passing through the body to reach the head of the device comprising a cap 11. The body is advantageously made of an opaque material, an element (component 17 described below) made of opaque material being incorporated so as to focus the luminous flux towards the cap. In a non-restrictive way, the body may be made of plastic or metal.

The device comprises attachment means for attaching onto said wall 2. These attachment means do not form the subject matter of the present application, and they may be of various natures. For example, the attachment means used consist, for example, of a nut 15 screwed onto an outer thread made on the lower part of the tubular body of the device or, as described in patent EP0889564B1, consist of a base that is assembled onto the tubular body, this base bearing fastening means such as set screws or pivoting fastening arms operated by means of a screw.

As described above, the device also comprises a head including a transparent coloured cap 11 allowing a luminous flux generated by the light block to pass through. The cap 11 is attached onto the body 10 of the device.

When the device also comprises a control function, it includes an actuatable button, and at least one electrical contact unit. The contact unit comprises one or more electrical contact blocks 14. Each electrical contact block 14 comprises a mobile contact switch actuatable by pressing the button of the control member. An emergency stop button thus comprises at least one electrical contact block, the switch whereof is configured in normally closed (NC) mode.

For supporting the contact unit and said light block, the device uses the attachment base 13, e.g. rectangular in shape. This base 13 comprises a central opening intended to be passed through by the lower part of the tubular body 10 and attachment means serving to detachably support the electrical contact blocks 14. According to the configurations, the base 13 may be rigidly connected to the attachment means or separate from these attachment means. In the latter case, the lower part of the body of the device interlocks into said base. In a control function device, action on the button actuates the switches of the contact blocks of the contact unit, simultaneously acting on the control of the light block for turning the light-emitting diode on or off.

Figure 1:
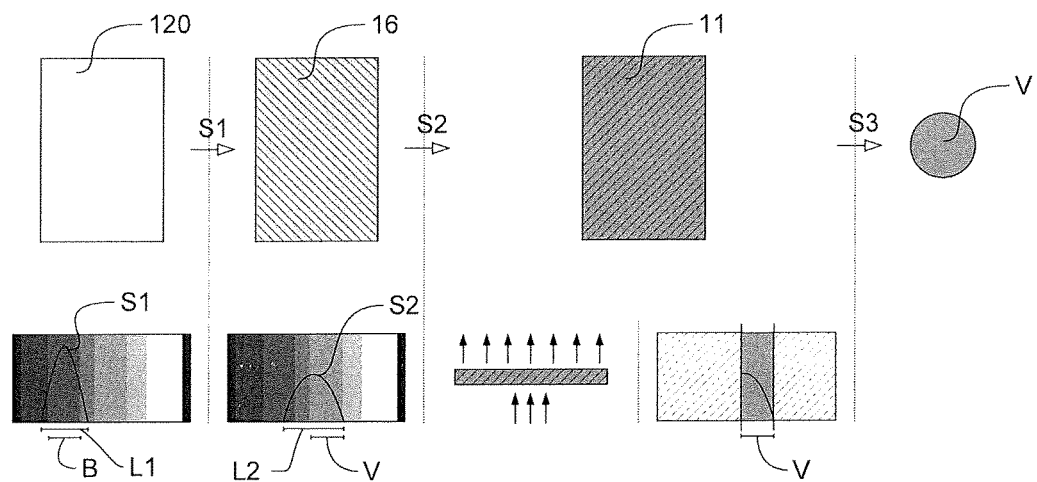
FIG. 1 illustrates the operating principle of the invention.

Referring to FIG. 1, the general principle of the invention is as follows:

Using a light block 12 which is always the same, i.e. with at least one light-emitting diode 120 emitting a light signal S1 always included in the same wavelength range, regardless of the final colour to be obtained through the cap of the device;

Using conversion means for converting the light signal emitted by the light-emitting diode 120 into a light signal S2 included in a second wavelength range;

Filtering the light signal S2 obtained at the output of the conversion means via a colour cap 11 suitable for obtaining a signal S3 emitted outwards with the desired colour (e.g. green V in FIG. 1).

Figure 3A:
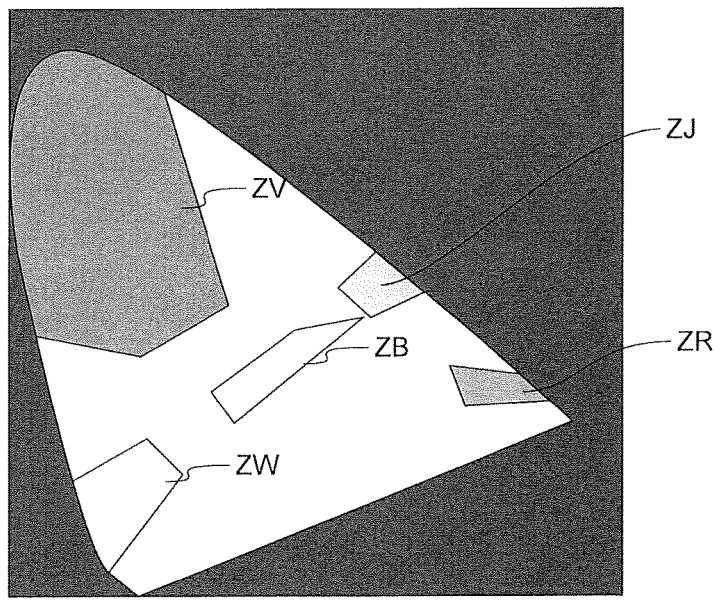
FIG. 3A represents a CIE (International Commission on Illumination) chromaticity diagram for identifying the standard colours in the light signalling field and FIG. 3B illustrates the principle of the invention through light spectra.

In the light signalling field, the emission colours are usually standard. FIG. 3A depicts a chromaticity diagram representing the various standard colour spaces. In this FIG. 3A, the standard colour spaces in the signalling field are identified by the letters ZV for green, ZB for blue, ZR for red, ZW for white, and ZJ for yellow. In a known manner, such a chromaticity diagram makes it possible to express each colour on the basis of three coefficients x, y, z each corresponding respectively to the level of a colour from among the three basic colours Red, Green, and Blue (RGB). Each standard colour space represented in FIG. 3 is therefore defined by a range of values taken by the coefficients x, y, z. A standard colour space is therefore defined by a set of colours included in an area of the diagram that is defined by a set of values x, y, z. Each standard colour space is a closed space. According to one aspect of the invention, it will involve obtaining at the output a colour included in the desired standard colour space (according to the chosen colour).

More precisely, according to one advantageous aspect of the invention, the light block 12 embeds a light-emitting diode 120 emitting the signal S1 in a first wavelength range L1 located in the blue or the ultraviolet.

In addition, the conversion means advantageously comprise an element 16 with a phosphor function, for converting the light signal S1 emitted by the light-emitting diode 120 in a first wavelength range L1 into a light signal S2 present in a second wavelength range L2. Advantageously, the phosphor material is chosen so that the light signal S2 obtained in the second wavelength range L2 corresponds to a colour (or chromaticity) space which is wider than said standard colour space mentioned above but which includes said standard colour space. Accordingly, the colour obtained at the output from the element 16 with a phosphor function, before filtering via the cap, is close to the desired final colour at the output from the cap.

The cap 11 is chosen so as to filter the light signal S2 obtained at the output from the element 16 with a phosphor function. The cap 11 is arranged for selecting a particular, more restricted wavelength range in the second, more extended wavelength range L2 so as to obtain a signal S3 of a wavelength L3 at the output. The cap may be made of a transparent or translucent plastic.

In other words, the conversion means are configured for converting the first light signal S1 with a view to obtaining a second light signal S2 with a colour defined by a wide colour space including the standard colour space and the cap is configured for selecting the desired colour belonging to the standard colour space in the wide colour space of the second light signal.

A phosphor material makes it possible to convert the light signal by increasing the wavelength of the signal. This explains why the light-emitting diode 120 is advantageously chosen for emitting in the blue or the ultraviolet. Indeed, it is from the blue or the ultraviolet that it is possible to go to the other colours, the reverse not being possible.

Below are some references for phosphor materials (Intematix datasheets) which can be used for producing the element with a phosphor function:
NYAG4752-L;
EG2762;

In addition, as the element 16 with a phosphor function is chosen for obtaining a light signal S2 in a wavelength range L2 which already includes the desired standard wavelength range at the output, the cap 11 may be chosen with a reduced filtering power, thus making it possible to obtain a light signal at the output of the cap that is particularly intense.

Figure 3B:
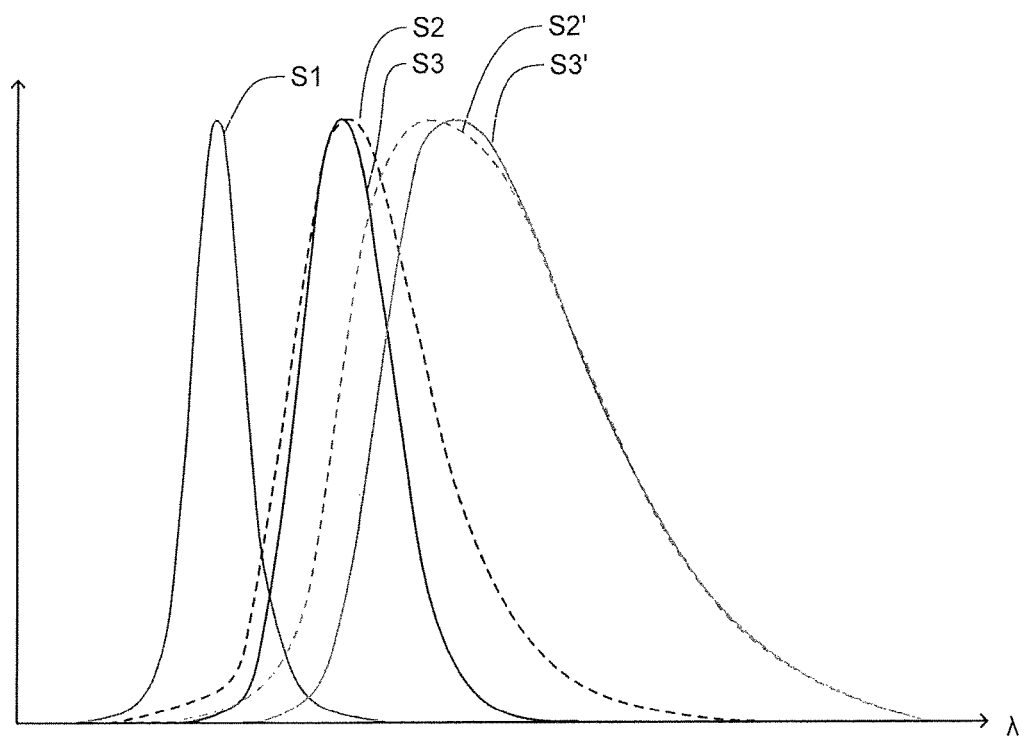

By way of example, FIG. 3B illustrates the principle of the invention through curves. The following can be seen in this FIG. 3B:

The curve representing the spectrum of the blue emission signal S1 emitted by the light-emitting diode 120 of the light block 12.

The curve representing the spectrum of the wavelength signal S2 obtained, after conversion of the light signal S1 emitted by the blue diode by a suitable element with a phosphor function, and included in the green standard colour space.

The curve representing the spectrum of the wavelength signal S2' obtained, after conversion of the light signal S1 emitted by the blue diode by a suitable element with a phosphor function, and included in the yellow standard colour space.

The curve representing the wavelength spectrum signal S3 obtained after filtering by the cap of the light signal S2 obtained at the output of the element with a phosphor function, for obtaining the colour green.

The curve representing the wavelength spectrum signal S3' obtained after filtering by the cap of the light signal S2' obtained at the output of the element with a phosphor function, for obtaining the colour yellow.

Figure 4A:
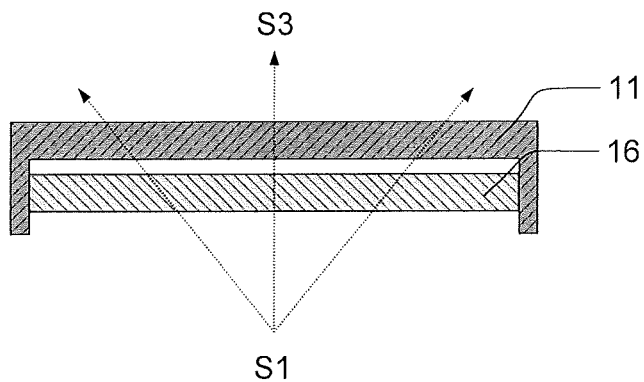
FIGS. 4A to 4C represent the various variant embodiments of the inventive solution.
Figure 4B:
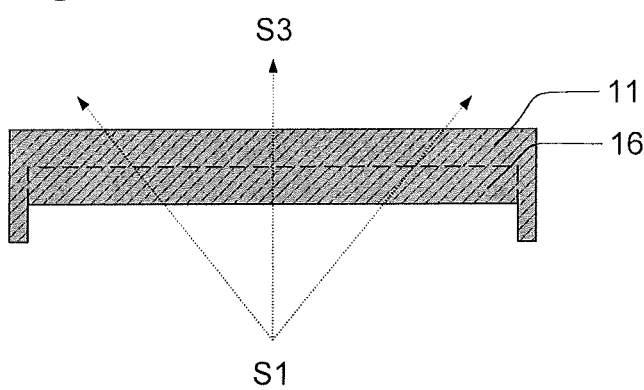
Figure 4C:
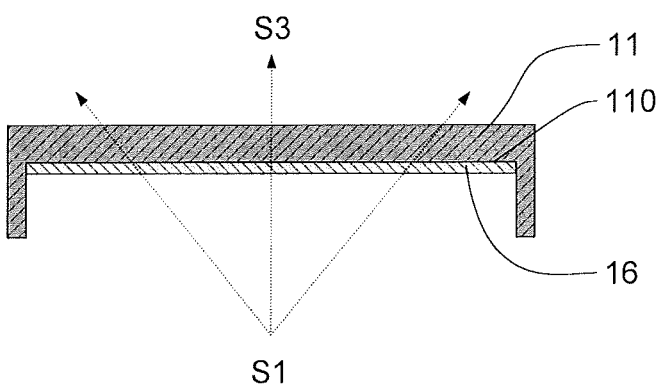

Referring to FIGS. 4A to 4C, for implementing the inventive solution, several distinct solutions may be considered:

The cap 11 and the element 16 with a phosphor function may be produced in two distinct components (FIG. 4A).

The cap 11 and the element 16 with a phosphor function may be produced in a single component, e.g. produced by bi-injection (FIG. 4B).

The element 16 with a phosphor function is formed of a layer of material deposited on the inner surface 110 of the cap 11 (FIG. 4C). The deposit may be produced by any suitable solution, spraying, coating with a paint, etc.

The element with a phosphor function consists of a lens made of phosphor material or having a layer made of phosphor material deposited on a component. This lens is positioned as close as possible to the light source formed by the light-emitting diode 120. By following a straight path along the axis (X), it is, for example, located closer to the diode than the cap, preferably at a distance of less than 5% of the total distance from the diode to the cap along said straight path. This solution would have the advantage of providing an element with a phosphor function with a surface area equivalent to the emission area of the light-emitting diode 120.

The element 16 with a phosphor function should be inserted between the cap 11 and the light source (diode 120) and capture the light signal S1 emitted by the light source, with a minimum of leakage.

Between the light source and the element 16 with a phosphor function, the device advantageously comprises an opaque side wall for channelling the luminous flux with a minimum of loss. According to the type of device, this opaque side wall will be, for example, formed of a component 17 (17A, 17B, 17C) responsible for guiding a maximum of light up to the element 16 with a phosphor function. When using an element with a phosphor function in the form of a lens, this will be positioned as close as possible to the source, as explained above, for minimising the luminous flux losses.

Between the element 16 with a phosphor function and the cap 11, the luminous flux should also be channelled to focus on the cap 11. According to the adopted configuration, the element 16 with a phosphor function will therefore be located as close as possible to the cap 11 for minimising the loss of luminous flux between these two elements. For this, as described above, it will be possible to produce the element 16 with a phosphor function and the cap 11 as a single component by bi-injection (FIG. 4B), making it possible to ensure a direct transfer of the luminous flux from the element with a phosphor function to the cap with a minimum of losses or to directly deposit the element 16 with a phosphor function in the form of a layer (e.g. a spray) on the inner face of the cap 11 (FIG. 4C).

Figure 6A:
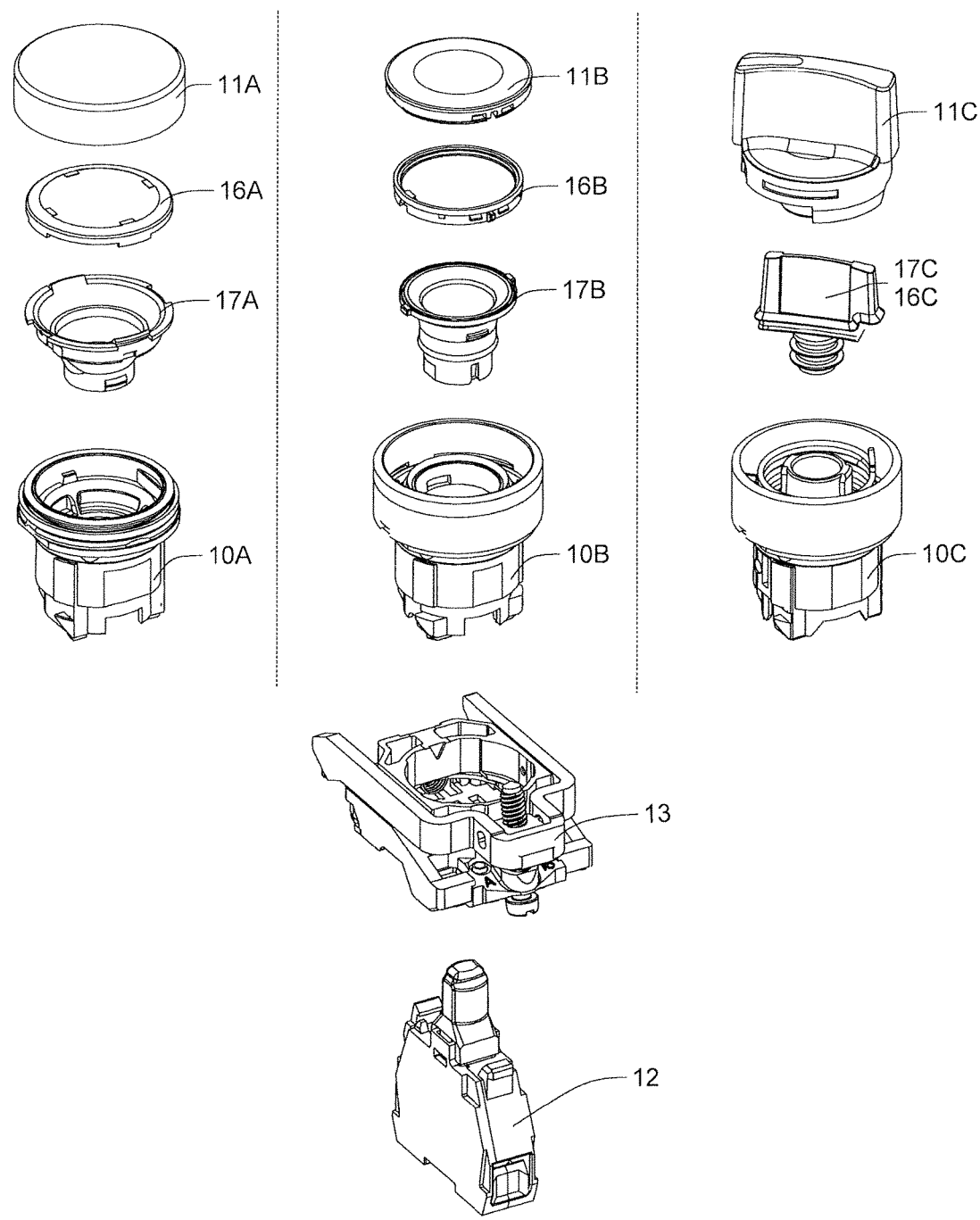
FIGS. 6A and 6B represent various embodiments of the device with a light signalling function of the invention, according to an exploded view in perspective and according to an axial longitudinal sectional view.
Figure 6B:
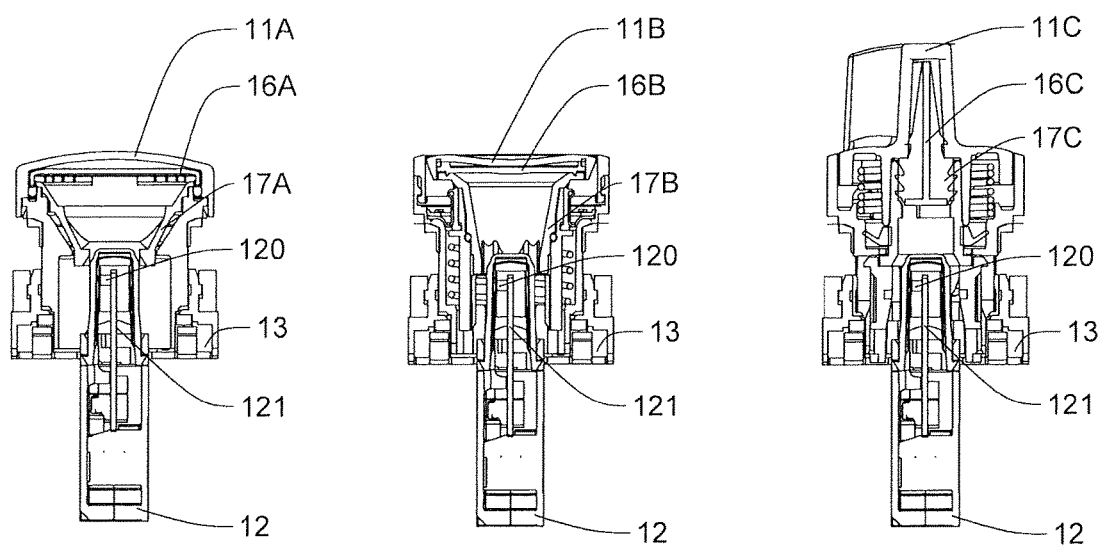

FIGS. 6A and 6B illustrate, for various device architectures, various solutions for implementing the invention. The various configurations for embodying the solution, described above in connection with FIGS. 4A to 4C, and the embodiment in the form of a lens, remain valid in these various architectures.

In these FIGS. 6A and 6B, the first configuration depicts a device including the light signalling function implemented by the invention and a control function implemented by a push-button. In this application, the cap 11A is implemented by the control button of the device. The element 16A with a phosphor function consists of a component housed under the cap. A funnel-shaped component 17A housed in the body, notably makes it possible to channel the luminous flux in the direction of the element 16A with a phosphor function and of the cap 11A. This component 17A is advantageously made of an opaque material, i.e. which does not allow light to pass through.

The second configuration represents a device including only the light signalling function. Similarly, the element 16B with a phosphor function consists of a component housed under the cap 11B. A funnel-shaped component 17B housed in the body, notably makes it possible to channel the luminous flux in the direction of the element 16B with a phosphor function and of the cap 11B. This component 17B is advantageously made of an opaque material, i.e. which does not allow light to pass through.

The third configuration represents a device including the light signalling function implemented by the invention and a control function implemented by a rotary knob including an actuatable projection. In this application, the cap 11C is implemented by the rotary control knob of the device. The element 16C (FIG. 6B) with a phosphor function consists of a component with a base and a projection housed in the hollow formed by a light guide component 17C arranged for being housed in the actuatable projection of the rotary knob. The luminous flux is channelled in the direction of the cap (11C) at least in part by the body made of an opaque material. The emitted luminous flux is visible in all directions and notably on the sides of the device.

In FIGS. 6A and 6B, it can be seen that the light block 12 is always the same regardless of the device. This block 12 comprises the light-emitting diode 120, e.g. soldered onto a printed circuit board 121 housed in the block, in the lengthwise direction. The block may comprise in its upper part a protuberance provided with an element made of transparent material (allowing light emitted by the signal S1 to pass through) via which the light signal S1 is emitted. When the block is attached onto the base 13, this protuberance is intended to pass through the opening formed through the base 13 and to be engaged in the axial channel of the body 10 of the device 1 in order to emit the light signal directly into the body 10 of the device 1 with the minimum of losses. The emitted light signal S1 will then, for example, be guided towards the cap 11 thanks to the guide formed by the component 17.

Figure 5A:
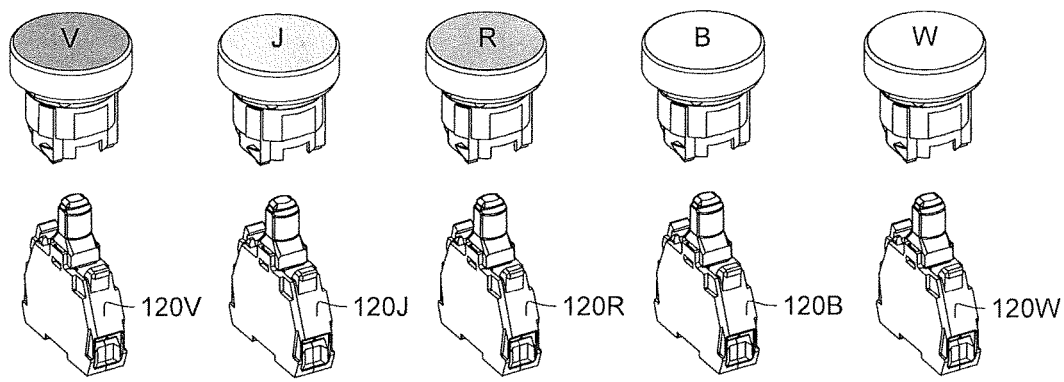
FIG. 5A illustrates the principle currently used for obtaining different colours in a device with a conventional signalling function and FIG. 5B illustrates the advantage offered by the inventive solution.
Figure 5B:
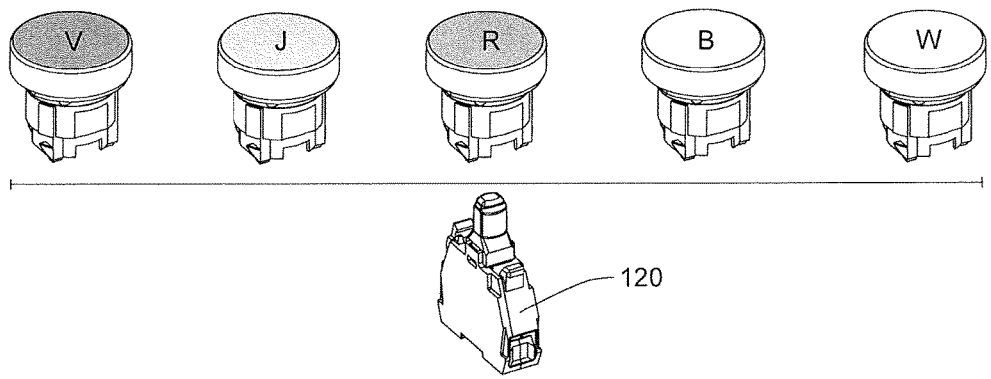

Referring to FIGS. 5A and 5B, it is clear that the inventive solution offers a number of advantages. In addition to obtaining better quality signalling with a higher intensity, it facilitates the use of such signalling devices, by providing a light block 12 that is always the same and obtaining a final colour by simply choosing a suitable cap. FIG. 5A indeed represents the current configuration in which a distinct light block (120V for obtaining green, 120J for yellow, 120R for red, 120B for blue, 120W for white) with a diode of distinct colour must be associated with a cap of suitable colour (V for green, J for yellow, R for red, B for blue, W for white) for obtaining the desired colour. FIG. 5B represents the inventive solution using a single light block (120) provided with a blue light-emitting diode for obtaining all the desired colours at the output (V (G—Green), J (Y—Yellow), R (R—Red), B (B—Blue), W (W—White)) by using the suitable conversion means and cap.

The invention claimed is:

1. A device with a light signaling function designed to emit a light signal outwards with a color included in a standard color space, said device comprising:
    a light-emitting diode designed to emit a first light signal in a first wavelength range in blue or ultraviolet;
    a conversion element configured to convert said first light signal emitted by the light-emitting diode in said first wavelength range into a second light signal in a second wavelength range;
    a cap arranged to select a more restricted wavelength range than a wavelength range of the standard color space, the more restricted wavelength range being within the second wavelength range which is more extended than the wavelength range of the standard color space and to output the light signal having a third wavelength corresponding to the color included in said standard color space,
    wherein:
    the conversion element is further configured so that said second wavelength range includes the entirety of said standard color space, and
    wherein the conversion element is an element with a phosphor function inserted between the light-emitting diode and the cap.

2. The device according to claim 1, further comprising a body, wherein the element with a phosphor function comprises a first component and the cap comprises a second component, the first component and the second component being attached independently onto said body.

3. The device according to claim 1, further comprising a body, wherein the element with a phosphor function and the cap are assembled onto the body in the form of a single component produced by bi-injection.

4. The device according to claim 1, wherein the element with a phosphor function comes in the form of a layer deposited on a surface of said cap.

5. The device according to claim 2, further comprising a light guide component arranged in the body of the device for guiding the first light signal towards said conversion means.

6. The device according to claim 5, wherein said light guide component is made of an opaque material.

7. The device according to claim 1, wherein the element with a phosphor function comprises a lens positioned above the light-emitting diode.

8. The device according to claim 2, further comprising a light block including said light-emitting diode.

9. The device according to claim 8, wherein the light block comprises a printed circuit board onto which said light-emitting diode is soldered.

10. The device according to claim 8, wherein the light block comprises a protuberance in which said light-emitting diode is housed, said protuberance including a transparent element through which said first light signal is emitted.

11. The device according to claim 8, further comprising a base including attachment means for attaching said light block.

12. The device according to claim 1, further comprising a control function, implemented from a push-button or a rotary knob.

13. The device according to claim 12, wherein the cap is made with a component forming the push-button or the rotary knob.

14. The device according to claim 1, wherein the standard color space is chosen from a green space, a red space, a blue space, a white space and a yellow space.

15. The device according to claim 1, wherein the conversion element is made of an yttrium aluminum garnet (YAG) based phosphor material.

16. The device according to claim 1, wherein the cap is configured to perform a filtering of the second light signal to select the more restricted wavelength range.

17. The device according to claim 16, wherein the filtering performed by the cap is a band-pass filtering.

\* \* \* \* \*